(12) United States Patent
Carter et al.

(10) Patent No.: US 12,074,356 B1
(45) Date of Patent: Aug. 27, 2024

(54) PLANAR TRANSMISSION LINE LOW-PASS FILTERS WITH ABSORPTIVE MATRIX AND METHOD FOR FORMING THE SAME

(71) Applicant: HRL Laboratories, LLC, Malibu, CA (US)

(72) Inventors: Faustin Carter, Santa Monica, CA (US); Jacob Blumoff, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 18/141,807

(22) Filed: May 1, 2023

Related U.S. Application Data (62) Division of application No. 17/323,994, filed on May 18, 2021.

(60) Provisional application No. 63/027,786, filed on May 20, 2020.

(51) Int. Cl.
*H01P 11/00* (2006.01)
*H01P 1/203* (2006.01)

(52) U.S. Cl.
CPC ............ *H01P 11/007* (2013.01); *H01P 1/203* (2013.01)

(58) Field of Classification Search
CPC ................................ H01P 11/007; H01P 1/203
See application file for complete search history.

(56) References Cited

U.S. PATENT DOCUMENTS

| | | |
|---|---|---|
| 6,593,833 B2 | 7/2003 | Joines |
| 9,270,071 B2 | 2/2016 | Abraham et al. |
| 9,300,029 B2 | 3/2016 | Abraham et al. |
| 9,847,568 B2 | 12/2017 | Abraham et al. |
| 9,948,050 B2 | 4/2018 | Abraham et al. |
| 2012/0249375 A1 | 10/2012 | Heino |
| 2017/0301432 A1 * | 10/2017 | Ma ........................ H01P 11/003 |

FOREIGN PATENT DOCUMENTS

WO  WO-0216477 A2 *  2/2002 ........ H01L 21/02118

OTHER PUBLICATIONS

Office Action 1 for U.S. Appl. No. 17/323,994, Date mailed: Aug. 8, 2022.
Response to Office Action 1 for U.S. Appl. No. 17/323,994, Date mailed: Sep. 13, 2022.
Office Action 2 for U.S. Appl. No. 17/323,994, Date mailed: Sep. 23, 2022.
Response to Office Action 2 for U.S. Appl. No. 17/323,994, Date mailed: Dec. 21, 2022.
Notice of Allowance for U.S. Appl. No. 17/323,994, Date mailed: Feb. 2, 2023.
Vion, D., Orfila, P. F., Joyez, P., Esteve, D., & Devoret, M. H. (1995). Miniature electrical filters for single electron devices. Journal of Applied Physics, 77(6), pp. 2519-2524.

(Continued)

*Primary Examiner* — Andrea Lindgren Baltzell
*Assistant Examiner* — Kimberly E Glenn
(74) *Attorney, Agent, or Firm* — TOPE-MCKAY & ASSOCIATES (57) ABSTRACT

Described is a method for forming a planar transmission line low-pass filter and a resulting filter. The method comprises several acts, including using lithographic processes and a castable polymer with absorptive matrix as a spin-on dielectric to form the planar transmission line low-pass filter.

2 Claims, 10 Drawing Sheets

(56) References Cited

OTHER PUBLICATIONS

Le Sueur et al., "Microfabricated electromagnetic filters for millikelvin experiments", Review of scientific instruments, 77(11), 2006, pp. 115102-1-115102-5.

Santavicca, D. F., & Prober, D. E. (2008). Impedance-matched low-pass stripline filters. Measurement Science and Technology, 19(8), 087001, pp. 1-6.

Slichter, D. H., Naaman, O., & Siddiqi, I. "Milikelvin thermal and electrical performance of lossy transmission line filters," Applied Physics Letters, 94(19), 192508 (2009), pp. 1-4.

Wollack, E. J., Chuss, D. T., Rostem, K., & U-Yen, K., "Impedance matched absorptive thermal blocking filters," Review of Scientific Instruments, 85 (3), 034702 (2014), pp. 1-6.

Longobardi, L., Bennett, D. A., Patel, V., Chen, W., & Lukens, J. E., "Microstrip filters for measurement and control of superconducting qubits," Review of Scientific Instruments, 84(1), 014706 (2013), pp. 1-5.

Thalmann, M., Pemau, H. F., Strunk, C., Scheer, E., & Pietsch, T., "Comparison of cryogenic low-pass filters. Review of Scientific Instruments," 88(11), 114703 (2017), pp. 1-14.

Zavyalov, V. V., Chernyaev, S. A., Shein, K. V., Shukaleva, A. G., & Arutyunov, K. Y., "Examination of cryogenic filters for multistage RF filtering in ultralow temperature experiments," In Journal of Physics: Conference series (vol. 969, No. 1, p. 012086), IOP Publishing (Mar. 2018), pp. 1-7.

\* cited by examiner

PLANAR TRANSMISSION LINE LOW-PASS FILTERS WITH ABSORPTIVE MATRIX AND METHOD FOR FORMING THE SAME

CROSS-REFERENCE TO RELATED APPLICATIONS

This application is a divisional application of U.S. Ser. No. 17/323,994, filed on May 18, 2021, which is a non-provisional patent application of U.S. 63/027,786, filed on May 20, 2020, the entirety of which are hereby incorporated by reference.

BACKGROUND OF INVENTION

(1) Field of Invention

The present invention relates to low-pass filters and, more specifically, to a planar transmission line low-pass filter with absorptive matrix.

(2) Description of Related Art

The present disclosure is generally directed to a planar transmission line filter. The idea of using planar transmission lines, in various geometries, as electromagnetic (EM) filters (low-pass, high-bass, band-pass, band-stop) is a long-established practice.

By way of example, some early work suggested the idea of using thin-film processes to construct dissipative RF filters for cryogenic environments. In the work of Vion et al, it is the skin effect of a long, lossy conductor that provides the loss, rather than the dielectric in a transmission line (see Vion, D., Orfila, P. F., Joyez, P., Esteve, D., & Devoret, M. H. (1995). "Miniature electrical filters for single electron devices," Journal of Applied Physics, 77(6), 2519-2524, the entirety of which is incorporated herein by reference). An improvement on the above design was described by le Sueur et al. (2006). "Microfabricated electromagnetic filters for millikelvin experiments", Review of scientific instruments, 77(11), 115102, the entirety of which is incorporated herein by reference. However, some deficits remained. The work of Santavicca et al. showed that castable Eccosorb could operate as a lossy dielectric in a cryogenic transmission line filter (see Santavicca, D. F., & Prober, D. E. (2008). "Impedance-matched low-pass stripline filters." Measurement Science and Technology, 19(8), 087001, the entirety of which is incorporated herein by reference). In their work, the resulting filter cavity was machined from a solid block of copper and the transmission line was hand soldered in. The cavity was then injected with the dielectric by-hand with a syringe, which is incredibly time intensive and prone to error.

A characterization and tuning of the Santavicca (2008) design was later described in Slichter, D. H., Naaman, O., & Siddiqi, I. in "Millikelvin thermal and electrical performance of lossy transmission line filters," Applied Physics Letters, 94(19), 192508 (2009), the entirety of which is incorporated herein by reference.

Yet another implementation of the Santavicca (2008) design was described by Wollack, E. J., Chuss, D. T., Rostem, K., & U-Yen, K., in "Impedance matched absorptive thermal blocking filters," Review of Scientific Instruments, 85(3), 034702 (2014), the entirety of which is incorporated herein by reference.

A totally different type of filter was also devised that attempts to solve the same problem using miniaturization techniques, showing that better dissipative filters for cryogenic measurements is something the community continues to chase. Said filter was described by Longobardi, L., Bennett, D. A., Patel, V., Chen, W., & Lukens, J. E., in "Microstrip filters for measurement and control of superconducting qubits," Review of Scientific Instruments, 84(1), 014706 (2013), the entirety of which is incorporated herein by reference.

Further, a recent review article on the state of cryogenic RF filtering was published by Thalmann, M., Pernau, H. F., Strunk, C., Scheer, E., & Pietsch, T., in "Comparison of cryogenic low-pass filters. Review of Scientific Instruments," 88(11), 114703 (2017), the entirety of which is incorporated herein by reference. Yet another recent article characterizing some consumer off-the-shelf (COTS) filters for cryogenic performance below 1 gigahertz (GHz) was published by Zavyalov, V. V., Chernyaev, S. A., Shein, K. V., Shukaleva, A. G., & Arutyunov, K. Y., in "Examination of cryogenic filters for multistage RF filtering in ultralow temperature experiments," In Journal of Physics: Conference series (Vol. 969, No. 1, p. 012086), IOP Publishing (2018, March), the entirety of which is incorporated herein by reference.

Since Santavicca (2008) published their original paper on using Eccosorb (a commercially available, castable polymer impregnated with magnetic nanoparticles) in cryogenic microwave filters, there has been a general drive to establish a process to make the filters smaller and to automate production via modularization as much as possible. New publications and patents regarding filters of this type all address one of these two improvements, but all designs so far utilize the method described by Santavicca (2008). The current designs machine a macroscopic cavity and then inject castable Eccosorb. In doing so, a single filter takes up a volume of order a few cubic centimeters. Notably, none of the prior art is capable of miniaturization by applying lithographic microfabrication techniques to integrate filters directly at the chip level where they are needed Thus, a continuing need exists for a planar transmission line low pass filter formed through lithographic microfabrication techniques to integrate filters directly at the chip level where they are needed, allowing for improvements over the prior art, such as generation of a single wafer that contains many (e.g., dozens) individual one centimeter square filter chips, each of which could have hundreds of discrete transmission line filters.

SUMMARY OF INVENTION

This disclosure provides a method for forming a planar transmission line low-pass filter and a resulting filter. The method comprises several acts, including using lithographic processes and a castable polymer with absorptive matrix as a spin-on dielectric to form the planar transmission line low-pass filter. Using lithographic processes and a castable polymer with absorptive matrix as a spin-on dielectric to form the planar transmission line low-pass filter comprises acts of: placing a layer of conducting material on a wafer substrate; applying and curing a polymer onto the layer of conducting material; adding a photoresist to the polymer; applying a hard mask such that the hard mask covers the photoresist and covered portions of the polymer, leaving exposed portions of the polymer exposed; removing the exposed portions of the polymer; removing the hard mask to expose the photoresist and covered portions of the polymer; and removing a portion of the conducting layer.

In another aspect, the present disclosure provides dissipative stripline transmission line filter, comprising: a microstrip ground plane, the microstrip ground plane being a patterned conducting layer formed on a wafer substrate; a first polymer dielectric layer having magnetic nanoparticles formed on the ground plane; a microstrip signal line formed on the polymer dielectric; a second polymer dielectric having magnetic nanoparticles formed on the signal line and first polymer dielectric layer; and a second ground plane being a patterned conducting layer formed on the second polymer dielectric layer.

In another aspect, at least one of, or both, of the first and second polymer dielectric layers have a thickness between 0.1 and 1000 microns.

In yet another aspect, each of the first and second polymer dielectric layers have a thickness between 1 to 100 microns.

Further, the ground plane has a thickness between 0.1 and 10 microns.

In another aspect, the ground plane has a thickness between 0.5 to 3 microns.

In yet another aspect, the microstrip signal line has a width between 0.1 and 1000 microns. In another aspect, the microstrip signal line has a width between 1 to 100 microns.

Finally, the present invention also includes a method for using the invention as described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to low-pass filters and, more specifically, to a planar transmission line low-pass filter with absorptive matrix. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first an introduction provides the reader with a general understanding of the present invention. Finally, specific details of various embodiment of the present invention are provided to give an understanding of the specific aspects.

(1) Introduction

The present disclosure is directed to a planar transmission line filter fabricated on a wafer substrate (e.g., sapphire, silicon, magnesium oxide (MgO), etc.). The filter is fabricated using micro/nano fabrication procedures, with a dielectric that includes a spun-on and subsequently patterned castable polymer (e.g., epoxy, resin, or glass) containing magnetic nano-particles. The filter can be implemented to operate as a filter in a variety of applications, such as a coplanar waveguide (CPW), a microstrip filter, a stripline filter, a coplanar strip (CPS) filter.

A chief objective of this filter is to act as a dissipative (as opposed to a reflective) filter for out of-band radiation. One particularly useful feature of such a filter is that it operates perfectly well at cryogenic temperatures down to absolute zero. Furthermore, the conductor element of the transmission line of such a cryogenic manifestation could be made from a superconductor, thus ensuring that only the controlled dielectric material accounts for loss (i.e., the loss is 100% tailored). The attenuation of the dielectric is such that it presents an exponential roll-off with increasing frequency that persists into the optical regime of electromagnetic radiation. This is in contrast to reflective lumped-element filters that stop working at frequencies such that the associated wavelength is of order the same size as the component (a few tens of GHz, typically).

A unique aspect provided by the present disclosure is the use of micro-fabrication procedures to integrate and pattern a spin-on polymer with embedded magnetic particles as a dielectric in planar transmission line filters that may be used as stand-alone components, or integrated directly with existing integrated-circuit fabrication methods. There are several advantages to this technique, including:

1. The use of micro-fabrication technologies for construction dramatically reduces the size scale of the filter over current approaches that effectively require by-hand assembly and fabrication in a one-at-a-time fashion.
2. Utilizing a micro-fabrication wafer-based approach means more filters in a given footprint (on of order 100 per centimeter), enhanced uniformity, and the ability to use proven fabrication tools for automation that result in economies of scale. In other words, this approach enables massively improved scalability and mass-production.
3. By using the same fundamental processes by which integrated circuits are fabricated, such filters may be integrated directly on the chip with the device under test, rather than as stand-alone modules.
4. An additional benefit of this method of fabrication that applies to the cryogenic use of such filters is the realization of enhanced thermalization at cryogenic temperatures, resulting in further improved performance.

As can be appreciated by those skilled in the art, the filter as described herein is broadly applicable to any device or measurement requiring low-pass filtering, and is especially useful for sensitive measurements conducted at cryogenic temperatures. Indeed, some such measurements are not possible at all without some sort of cryogenic dissipative filter. Applications of such a filter include the cryogenic high-frequency measurement of quantum bits which necessitate such filtering.

(2) Specific Details of Various Embodiments

As noted above, the invention is the application of micro-fabrication techniques to the creation of electromagnetic low-pass filters made of lossy absorbing material. As an example, such a lossy, microwave- and infrared-absorbing material might be Eccosorb® CR from Laird™ (located at 8 Pengfeng Rd, Songjiang Qu, Shanghai Shi, China), in which magnetic nanoparticles are embedded in a polymer. That example polymer is provided, uncured, as two liquids, which are later combined before use and curing.

Figure 1A:
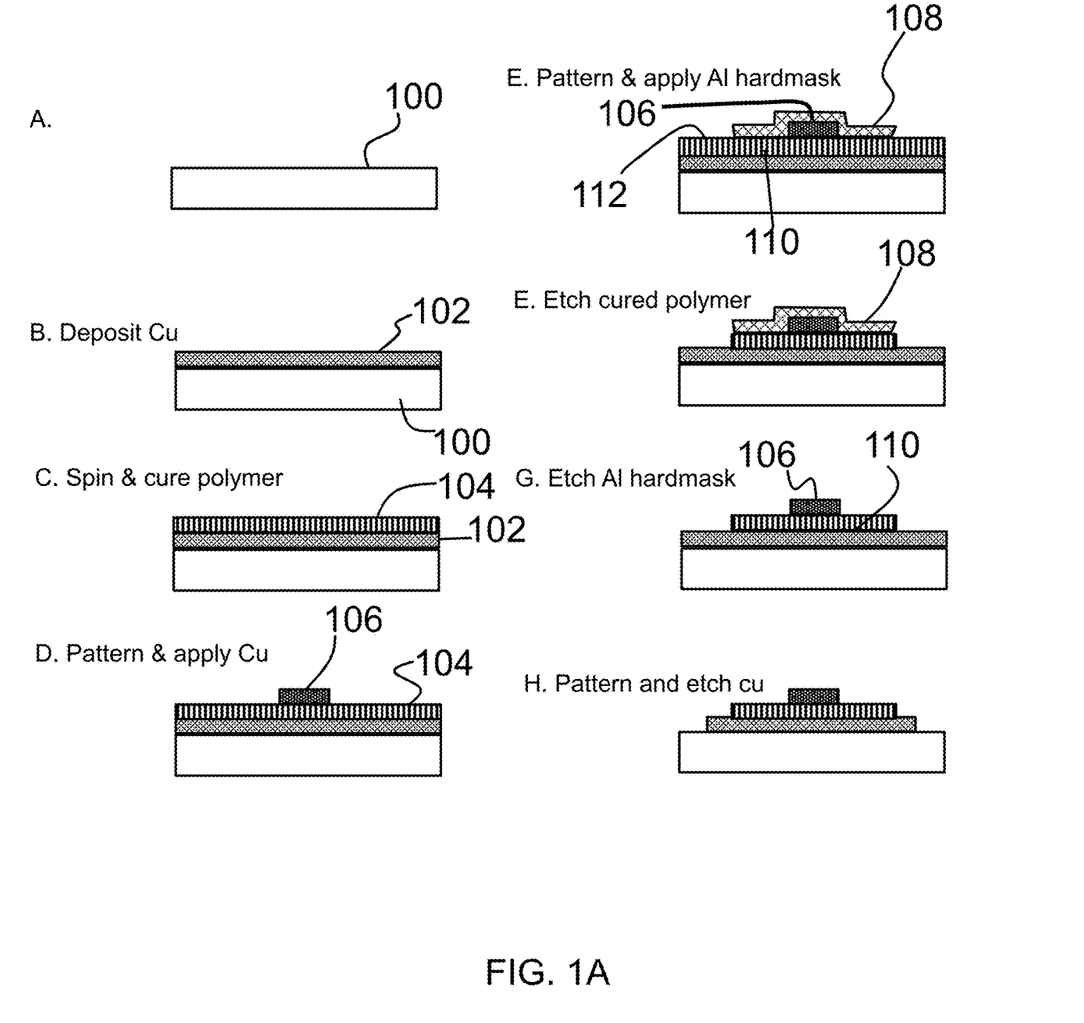
FIG. 1A is an illustration depicting a process for forming a transmission line low-pass filter according to various embodiments of the present invention.

As shown in FIG. 1A, the process involves placing a patterned conducting layer 102 (e.g. copper) on a wafer substrate 100 (e.g. silicon). After which a patterned layer of absorbing material is applied. The patterned layer of absorbing material is applied using an etching technique, as depicted in FIG. 1A. As shown in steps B and C, a polymer 104 is spun (e.g., using a spin coater) and cured onto the conducting layer 102. The polymer 104 is cured using any suitable technique, such as simply room temperature or kiln (heated) drying or, for some types of polymer, ultraviolet curing. A non-limiting example of the polymer is Eccosorb® as produced by Laird. Traditionally, UV curing would not work on Eccosorb® because it is not transparent. However, in thin enough layers, the polymer becomes transparent. Further, an additive can be used to make cross-linking via UV possible. Alternately, ferrous nano-particles can be added to a traditional photo resist to make such a material.

Figure 7:
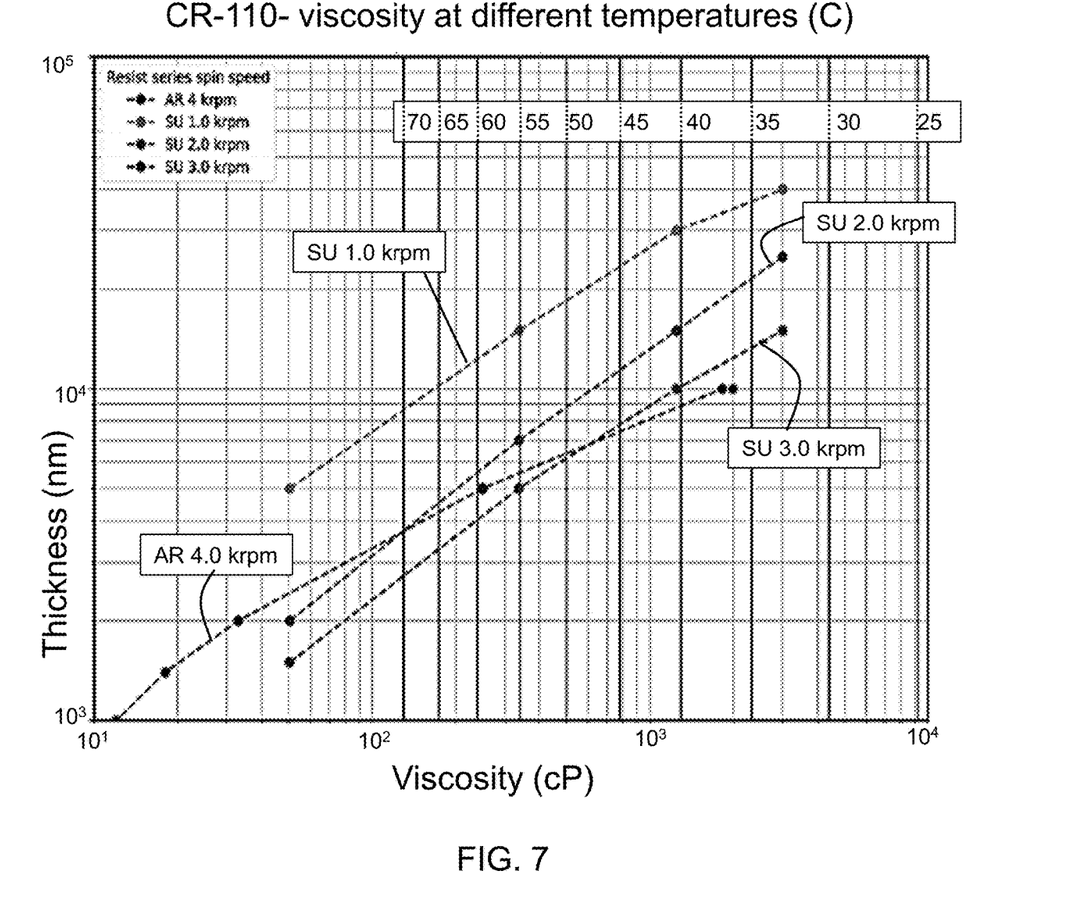
FIG. 7 is a spin-speed lookup plot used to estimate a spin speed and temperature, depicting a target thickness and viscosity of the spun polymer.
Figure 8:
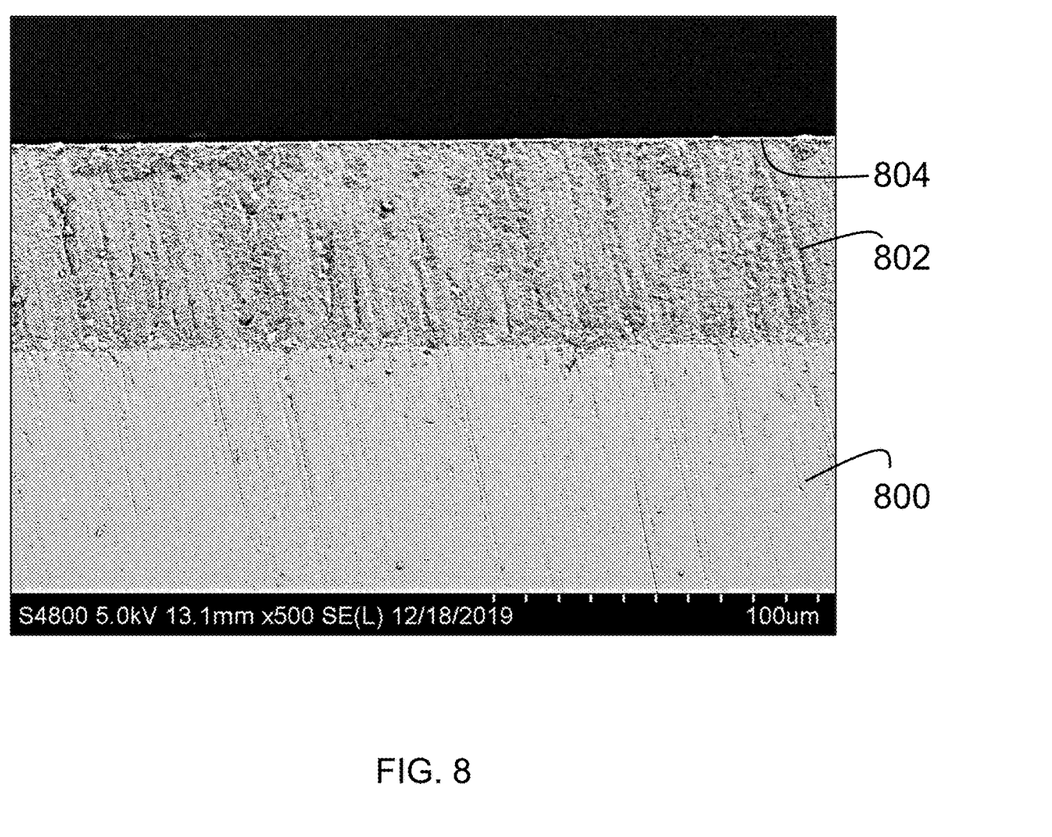
FIG. 8 is a scanning electron microscope (SEM) cross-sectional image depicting a Si wafer with a polymer spun onto the Si wafer.

Spinning the polymer can be performed, for example, at the speeds and temperature as illustrated in the plot as shown in FIG. 7. FIG. 7 is a plot used to determine a first pass at spin speed (resist series) and temperature in Celsius, depicting the resulting thickness and viscosity of the spun polymer. The spin-speed lookup plot of FIG. 7 depicts the thickness of two conventional photoresists (i.e., SU and AR) as a function of their viscosity (i.e., their dilution in a solvent) and (for the SU resist) as a function of spin speed. Also shown is the viscosity of CR-110 (CR-110 and CR-124 are examples of specific versions of the Eccosorb® absorbing product) as measured at various temperatures. For example, if CR-110 were heated to 40C, the spin process achieves a film thickness of 10-30 microns, depending on spin speed. The spinning process has been shown to generate the desired spun polymer. For example, FIG. 8 is an scanning electron microscope (SEM) cross-sectional image depicting a Si wafer 800 with approximately 70 micrometers of polymer 802 (e.g., Eccosorb®) spun onto it, with approximately 300 nanometers of aluminum 804 on top of the polymer 802. Thus, using the process as described herein allows for precise and thin dimensions of the polymer, etc. For example, in one aspect, at least one of, or both, of the first and second polymer dielectric layers have a thickness between 0.1 and 1000 microns (or more desirably, between 1 to 100 microns). Further, ground plane has a thickness between 0.1 and 10 microns (or more desirably, between 0.5 to 3 microns). Additionally, the microstrip signal line has a width between 0.1 and 1000 microns (or more desirably, between 1 to 100 microns).

Figure 9A:
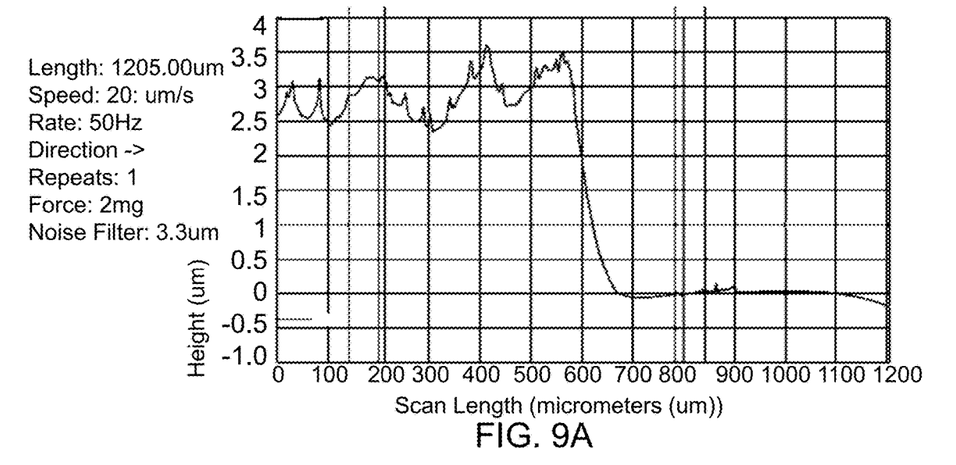
FIG. 9A is a graph illustrating cross-sectional results from an SEM scan of a spun polymer (different from that of FIG. 8)
Figure 9B:
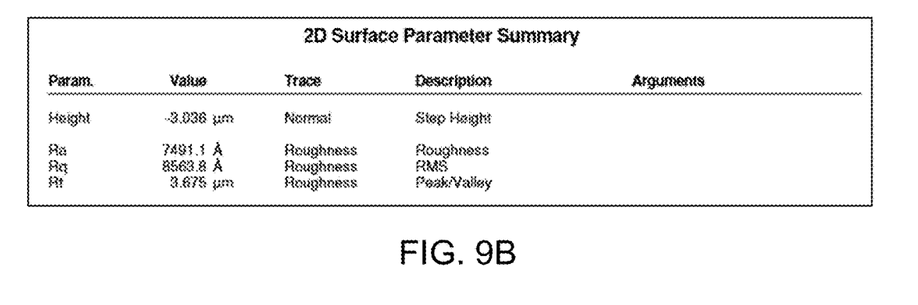
FIG. 9B is a table summarizing two-dimensional surface parameters of the spun polymer of FIG. 9A.

FIG. 9A further illustrates the spin rules, providing cross-sectional results from a profilometer scan (of a different wafer from that depicted in FIG. 8), showing an Eccosorb® step height of approximately 3 microns. FIG. 9B is a table summarizing the two-dimensional surface parameters of the spun polymer.

Referring again to FIG. 1A, Step D involves applying a photo resist, patterning it, developing it, depositing a conductor (a metal such as copper (cu)), then lifting off the resist, leaving behind patterned copper. These are condensed into one graphical step, which will be readily understood by those skilled in the art.

A hard mask 108, such as an aluminum hard mask, is then applied and patterned to cover the conductor 106 and covered portions 110 of the polymer 104, while leaving exposed portions 112 of the polymer 104 exposed.

Thereafter, the exposed portions 112 (cured polymer) are etched away using any suitable technique, such as a hot solvent or with a dry plasma etch. For example, for Eccosorb® CR, methyl ethyl ketone (MEK) can be used as a solvent. Regarding plasma etching, any plasma etch that is chiefly ablative ($SF_6$ or Ar) can be used.

The hard mask (e.g., Al) 108 is then etched away to expose the conductor (e.g., Cu) 106 and covered portion 110 of the cured polymer 104. For example, Potassium Hydroxide (KOH) or Tetramethylammonium Hydroxide (TMAH) can be used to etch the Al layer while not etching the Cu layer. Step H involves application of photo resist, exposing it, developing it, then etching the now-exposed copper ground plane. In FIG. 1A, the ground plane (i.e., conducting layer 102) is deposited in Step B, and the signal traces (i.e., conductor 106) are deposited in Step D. The resulting devices may be diced or cleaved, then packaged for connection or integration using standard IC techniques.

Figure 1B:
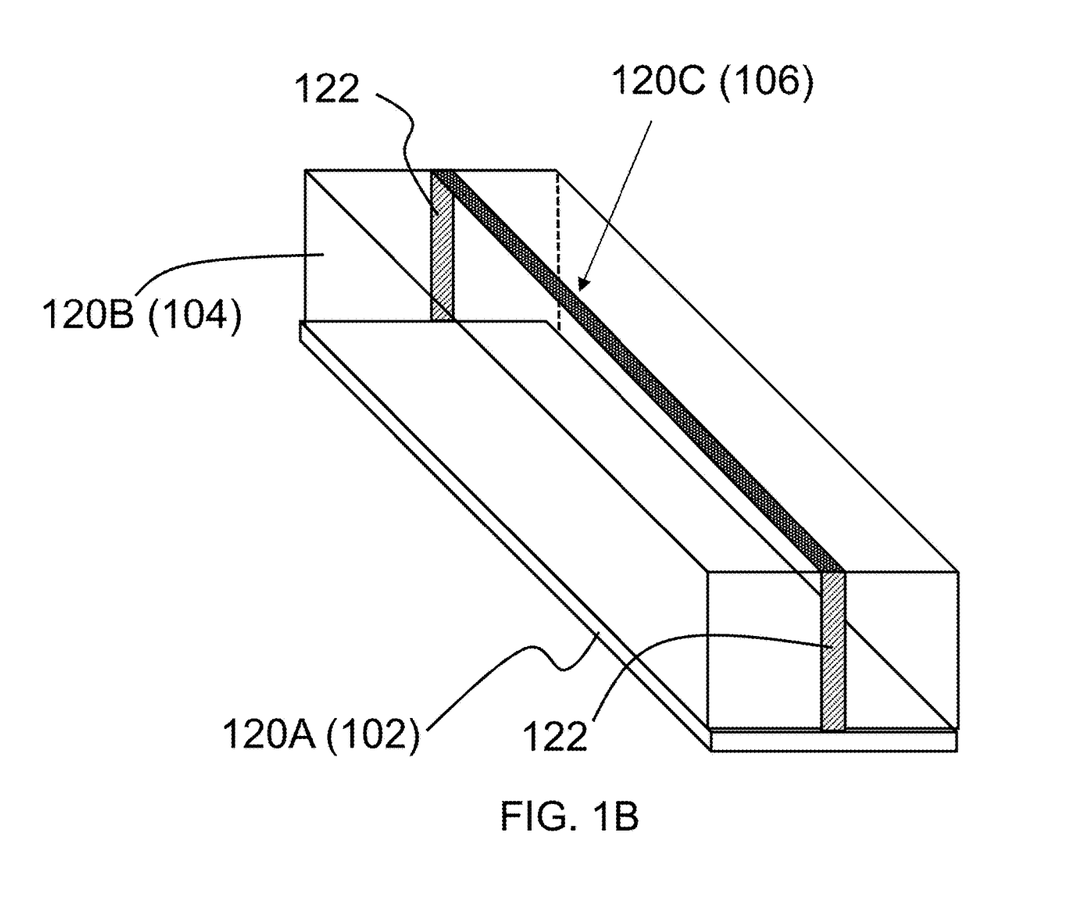
FIG. 1B is an illustration of a microstrip transmission line filter formed according to various embodiments of the present invention.

In another aspect, additional patterned conducting or absorbing layers may be added. This refers to a notion of iterating either of the previously described processes, resulting in additionally stacked layers of the device. FIG. 4 depicts such a device, where additional dielectric and conducting layers have been added. FIG. 1B on the other hand, illustrates a single-layer product (e.g., micro-transmission line), which could have been produced by either of the discussed processes.

Figure 1C:
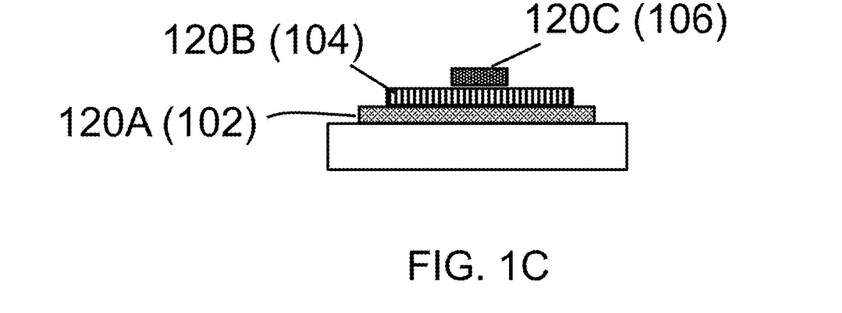
FIG. 1C is a (not-to-scale) cross-sectional view illustration of Step H of FIG. 1A, wherein some dimensions have been reduced or exaggerated for clarity.

FIG. 1B depicts a model of a section of micro-strip transmission line of arbitrary length terminated on either end with matched loads. The bottom rectangle in the X-Y plane is the microstrip ground plane 120A, and the narrow thin rectangle above the ground plane is the microstrip signal line 120B. FIG. 1B depicts the microstrip transmission line filter 120 with a CR-124 dielectric 120C. The vertical rectangles on either end are lumped-element 50-Ohm ports 122. A CR-124 dielectric 120C is an example of a specific version of the Eccosorb® absorbing product. FIG. 1B represents a zoom-in of a final product, such as Step D or H of FIG. 1A. In this illustration, the limited extent of the dielectric and of the lower copper layer is not shown. For further understanding, FIG. 1C provides a cross-sectional view of Step H of FIG. 1A as applicable to a transmission line filter 120, showing the components of Step H being used as a microstrip ground plane 120A, the microstrip signal line 120B, and dielectric 120C. Note that FIG. 1C is not at the same scale as FIG. 1B. Dimensions have been adjusted to promote conceptual clarity.

Figure 4A:
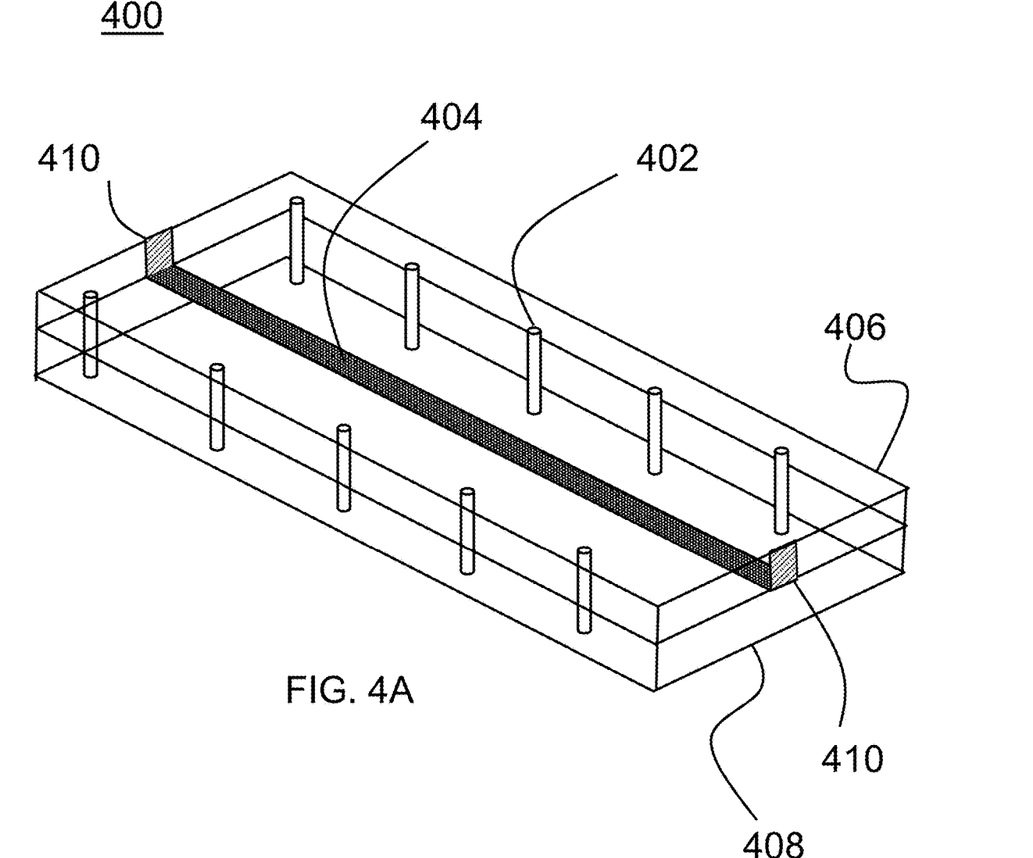
FIG. 4A is an illustration of a stripline transmission line filter formed according to various embodiments of the present invention.
Figure 4B:
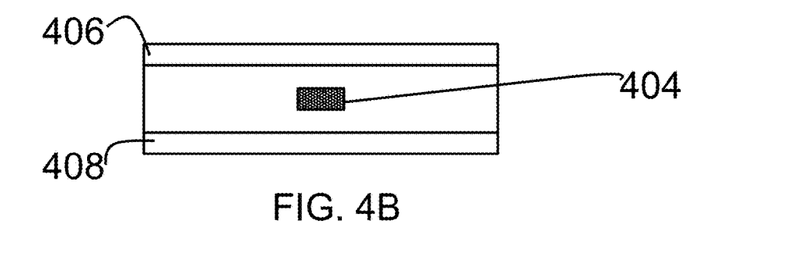
FIG. 4B is a (not-to-scale) cross-sectional view of the illustration as depicted in FIG. 4A, wherein some dimensions have been reduced or exaggerated for clarity.

Another example of a transmission line filter is shown in FIGS. 4A and 4B. In this example, the transmission line filter 400 has a stripline geometry with vias 402 using CR-110 as a dielectric. The cylinders on either side of the transmission line are the vias 402 that electrically connect the two ground planes 406 and 408. Here the "ground planes" refer to the initial bottom conducting layer, as shown in FIG. 1A as element 102, as well as an additional large (third) conducting layer. This is the definition of a "stripline geometry." In other words, the vias 402 connect the top and bottom conducting layers 406 and 408. The center conductor 404 is the signal line and it is between the two ground planes 406 and 408. The phrase "ground planes" is not requisite, but is understood by those skilled in the art. The rectangles on either end of the construction are 50-Ohm lumped ports 410

Alternately, one may use the above techniques to integrate a quantity of patterned Eccosorb® in a targeted manner to existing integrated circuit designs during fabrication.

Figure 2:
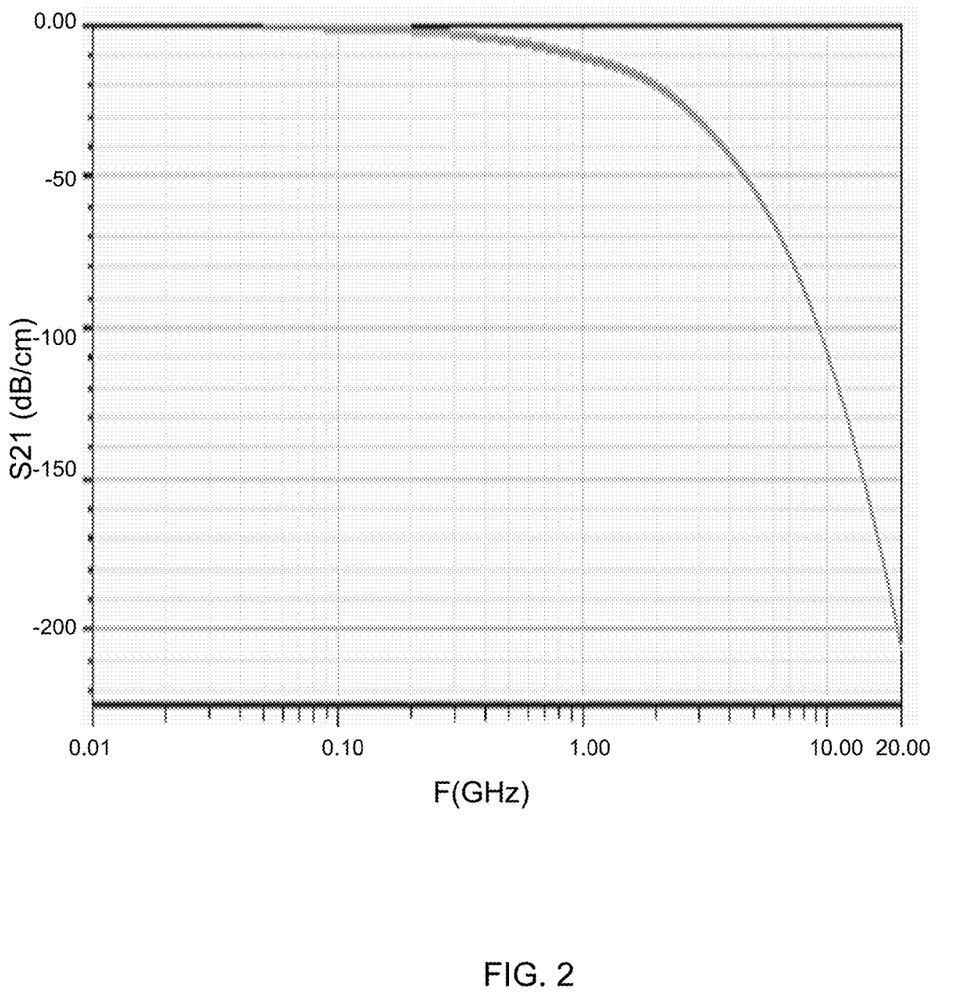
FIG. 2 is a graph illustrating a simulation of the filter as depicted in FIG. 1B, showing a loss of 10 dB/cm at 1 GHz and a loss of 100 dB/cm at 10 GHz.
Figure 3:
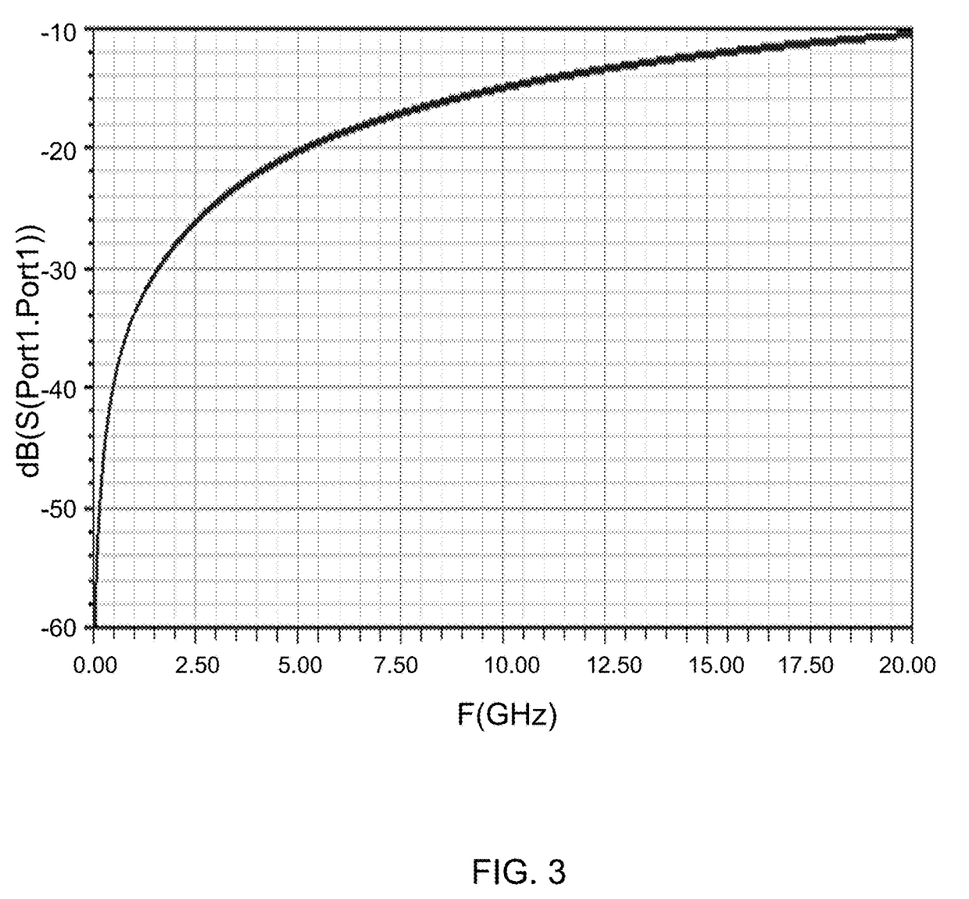
FIG. 3 is a graph illustrating a simulation of the filter as depicted in FIG. 1B, showing a good reflection coefficient for frequencies up to 5 GHz.
Figure 5:
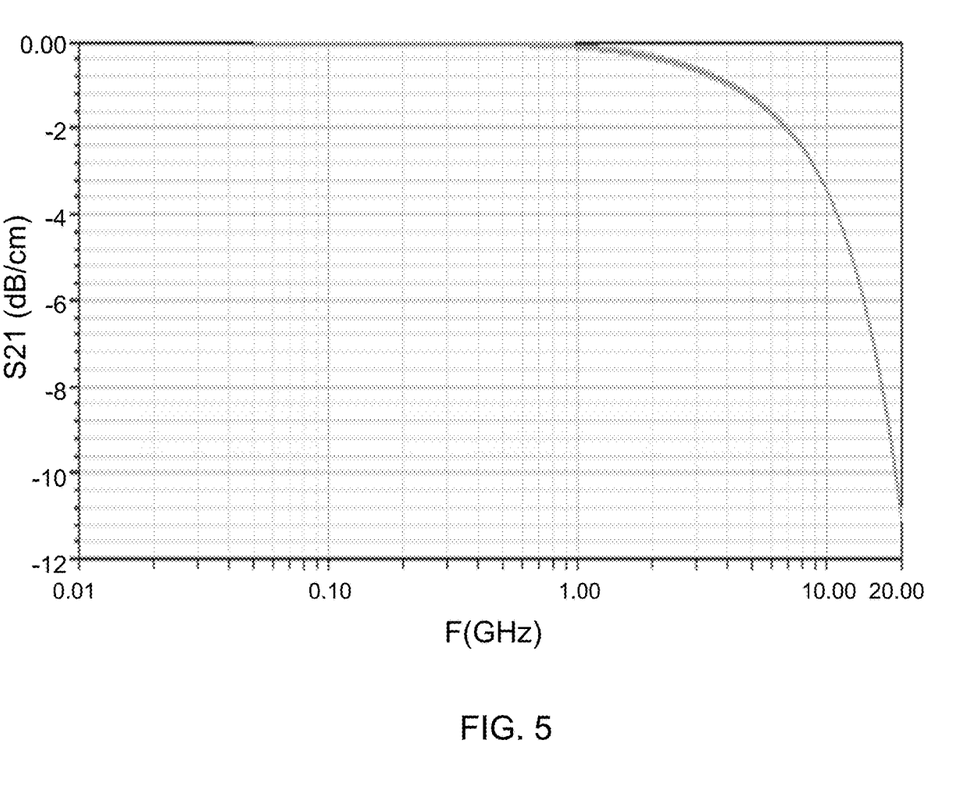
FIG. 5 is a graph illustrating a simulation of the filter as depicted in FIG. 4A, showing a loss of 3.2 dB/cm at 10 GHz.
Figure 6:
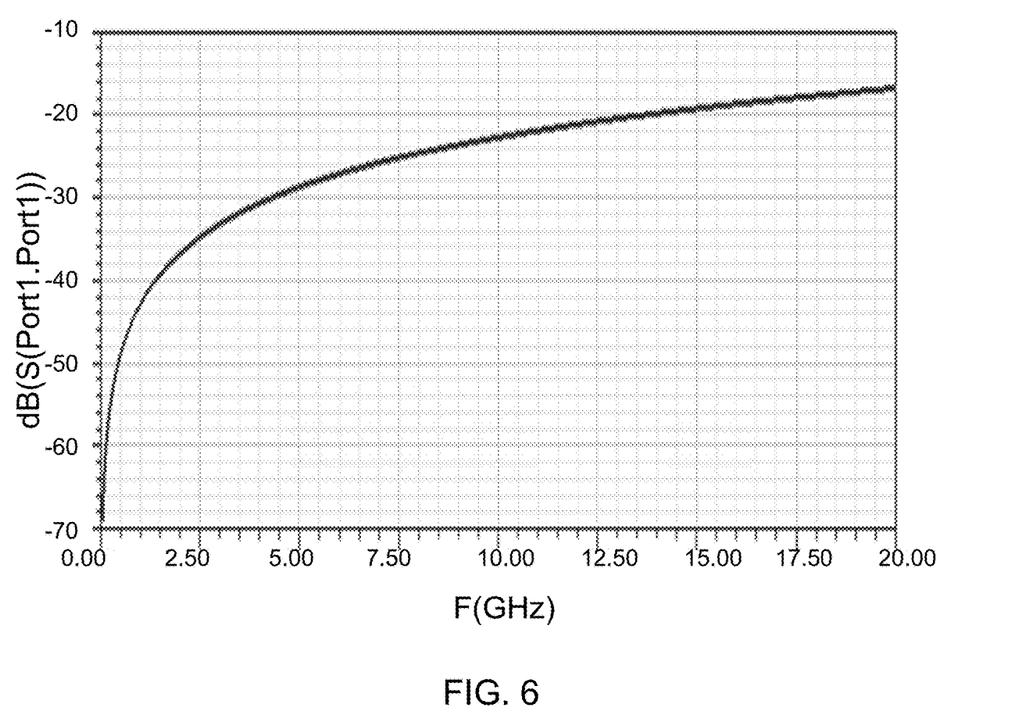
FIG. 6 is a graph illustrating a simulation of the filter as depicted in FIG. 4 showing a good reflection coefficient for frequencies up to roughly 15 GHZ.

Two simulations of such planar filters have been performed using Ansys HFSS, produced by Ansys, located at Southpointe, 2600 Ansys Drive, Canonsburg, PA 15317. Ansys HFSS is a 3D electromagnetic (EM) simulation software for designing and simulating high-frequency electronic products, such as the designs as depicted in FIGS. 1B and 4A. In this example, both are one centimeter (cm) long transmission lines. One with microstrip geometry (as shown in FIG. 1B) and CR-124 dielectric targeting a 3 dB cutoff of 500 MHz (with results depicted in FIGS. 2 and 3), and one with the strip line geometry (shown in FIG. 4A) using a CR-110 dielectric targeting a 3 dB cutoff of 5 GHz (results depicted in FIGS. 5 and 6). "Good reflection coefficient" was defined to mean the amount of reflected power is below −20 dB with reference to the incident power.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A method for forming a planar transmission line low-pass filter, comprising an act of:
using lithographic processes and a castable polymer with microwave-absorbing material as a spin-on dielectric to form the planar transmission line low-pass filter.

2. The method of claim 1, wherein using lithographic processes and the castable polymer with microwave-absorbing material as a spin-on dielectric to form the planar transmission line low-pass filter comprises acts of:
placing a layer of conducting material on a wafer substrate;
applying and curing a polymer onto the layer of conducting material;
adding a photoresist to the polymer;
applying a hard mask such that the hard mask covers the photoresist and covered portions of the polymer, leaving exposed portions of the polymer exposed;
removing the exposed portions of the polymer;
removing the hard mask to expose the photoresist and covered portions of the polymer; and
removing a portion of the layer of conducting material.

* * * * *